(12) United States Patent
Coldwate et al.

(10) Patent No.: US 11,218,058 B2
(45) Date of Patent: Jan. 4, 2022

(54) WINDING SEPARATORS

(71) Applicant: Hamilton Sundstrand Corporation, Charlotte, NC (US)

(72) Inventors: Joseph Kenneth Coldwate, Roscoe, IL (US); Tadashi Sawata, Coventry (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 372 days.

(21) Appl. No.: 16/176,323

(22) Filed: Oct. 31, 2018

(65) Prior Publication Data

US 2020/0136472 A1    Apr. 30, 2020

(51) Int. Cl.
*H02K 9/22* (2006.01)
*H02K 1/14* (2006.01)
*H02K 15/02* (2006.01)

(52) U.S. Cl.
CPC .............. *H02K 9/22* (2013.01); *H02K 1/146* (2013.01); *H02K 15/022* (2013.01)

(58) Field of Classification Search
CPC ........ H02K 15/022; H02K 1/146; H02K 9/22; H02K 3/18; H02K 3/34
See application file for complete search history.

(56) References Cited

U.S. PATENT DOCUMENTS

| 6,847,137 | B2 | 1/2005 | Furuse | |
|---|---|---|---|---|
| 9,985,492 | B2 | 5/2018 | Mahler | |
| 10,014,751 | B2 | 7/2018 | Raminosa | |
| 2015/0280508 | A1* | 10/2015 | Hirota | H02K 3/325 310/215 |
| 2017/0117776 | A1 | 4/2017 | Pal et al. | |
| 2018/0175707 | A1 | 6/2018 | Miyama et al. | |
| 2018/0287436 | A1* | 10/2018 | Xu | H02K 7/006 |
| 2019/0109515 | A1* | 4/2019 | Hopkins | H02K 1/04 |

FOREIGN PATENT DOCUMENTS

| DE | 102006003498 A1 * | 8/2007 | ............. H02K 3/487 |
|---|---|---|---|
| DE | 102006003498 A1 | 8/2007 | |
| JP | 2002/171704 A | 6/2002 | |

OTHER PUBLICATIONS

Extended European Search Report dated Apr. 1, 2020, issued during the prosecution of European Patent Application No. EP 19206305.5.

* cited by examiner

*Primary Examiner* — Bernard Rojas
(74) *Attorney, Agent, or Firm* — Locke Lord LLP; Joshua L. Jones; Scott D. Wofsy

(57) ABSTRACT

An electric machine includes a winding yoke defining a plurality of winding slots between circumferentially spaced apart teeth. A respective winding separator is mounted within each of the winding slots. The winding separator is mounted to a keying feature that extends from the winding yoke into the winding slot. The winding yoke can be a laminated structure, wherein the teeth and keying features are part of a common laminated structure with the winding yoke. The winding yoke can be a stator, and a rotor can be mounted within the stator for rotary movement relative to the stator.

12 Claims, 3 Drawing Sheets

WINDING SEPARATORS

BACKGROUND OF THE INVENTION

1. Field of the Invention

The present disclosure relates to electrical machines, and more particularly to winding separators for electrical machines such as motors, generators, and motor/generators.

2. Description of Related Art

For some types of electrical machines (motors and generators) the stator windings are subjected to extreme thermal conditions over long periods of time due to continuous duty cycle and self-heating. It is well understood that the insulation life of the windings (e.g., magnet wire enamel and impregnation) is inherently reduced with exposure to extreme temperature over long periods of time. General practice to extend winding insulation life is to reduce winding temperatures as much as practical through the management of heat rejection, e.g., through active and/or passive cooling.

Active cooling can include convection cooling. Examples of convection cooling include the use of cooling air directed over the machine housing, which can include heat transfer fins, from a shaft mounted fan or through the use of a cooling fluid routed through a sealed jacket mounted around the periphery of the machine housing. Passive cooling can include conduction through the various components of the machine to the outer frame and associated structure to which the machine is mounted. Generally, heat rejections schemes include both passive and active methods.

The conventional techniques have been considered satisfactory for their intended purpose. However, there is an ever present need for improved heat rejection in electric machines. This disclosure provides a solution for this need.

SUMMARY OF THE INVENTION

An electric machine includes a winding yoke defining a plurality of winding slots between circumferentially spaced apart teeth. A respective winding separator is mounted within each of the winding slots. The winding separator is mounted to a keying feature that extends from the winding yoke into the winding slot.

The winding yoke can be a laminated structure, wherein the teeth and keying features are part of a common laminated structure with the winding yoke. The winding yoke can be part of a stator, and a rotor can be mounted within the stator for rotary movement relative to the stator.

A first winding phase can be seated in each winding slot and a second winding phase can be seated in each winding slot. The first and second winding phases can be separated from one another by the respective winding separator. The winding separator can include at least one of thermally conductive ceramics and/or plastics.

The keying feature can be in intimate thermal contact with a keying receptacle of the winding separator. Thermal paste can be included between the keying feature and the keying receptacle. The keying feature can include a neck that extends radially into the winding separator and a head extending radially from the neck that is wider than the neck. The keying feature can have a constant cross-sectional shape as a function of position in an axial direction.

Each tooth can include a pair of circumferentially spaced apart walls that are parallel to one another, and the winding separator can have a triangular axial cross-sectional shape separating the winding slot into two sections with constant spacing between the winding separator and circumferentially adjacent teeth. It is also contemplated that each tooth can include a pair of circumferentially spaced apart walls that are not parallel, giving the tooth a trapezoidal axial cross-sectional shape, and the winding separator can have a rectangular axial cross-sectional shape separating the winding slot into two sections with constant spacing between the winding separator and circumferentially adjacent teeth.

A method includes punching a layer of material to form a layer of an electric machine yoke. The layer of an electric machine yoke is punched to include a keying feature circumferentially between each pair of a plurality of circumferentially spaced apart teeth of the layer of an electric machine yoke.

The method can include individually punching at least one additional layer of material to form a plurality of layers of an electric machine yoke, wherein each layer of an electric machine yoke is punched to include a keying feature circumferentially between each pair of a plurality of circumferentially spaced apart teeth of the layer of an electric machine yoke. The method can include joining the layers of the plurality of layers of an electric machine yoke to form a yoke lamination for an electrical machine. Joining the layers can include joining the layers to form a stator yoke for an electric machine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
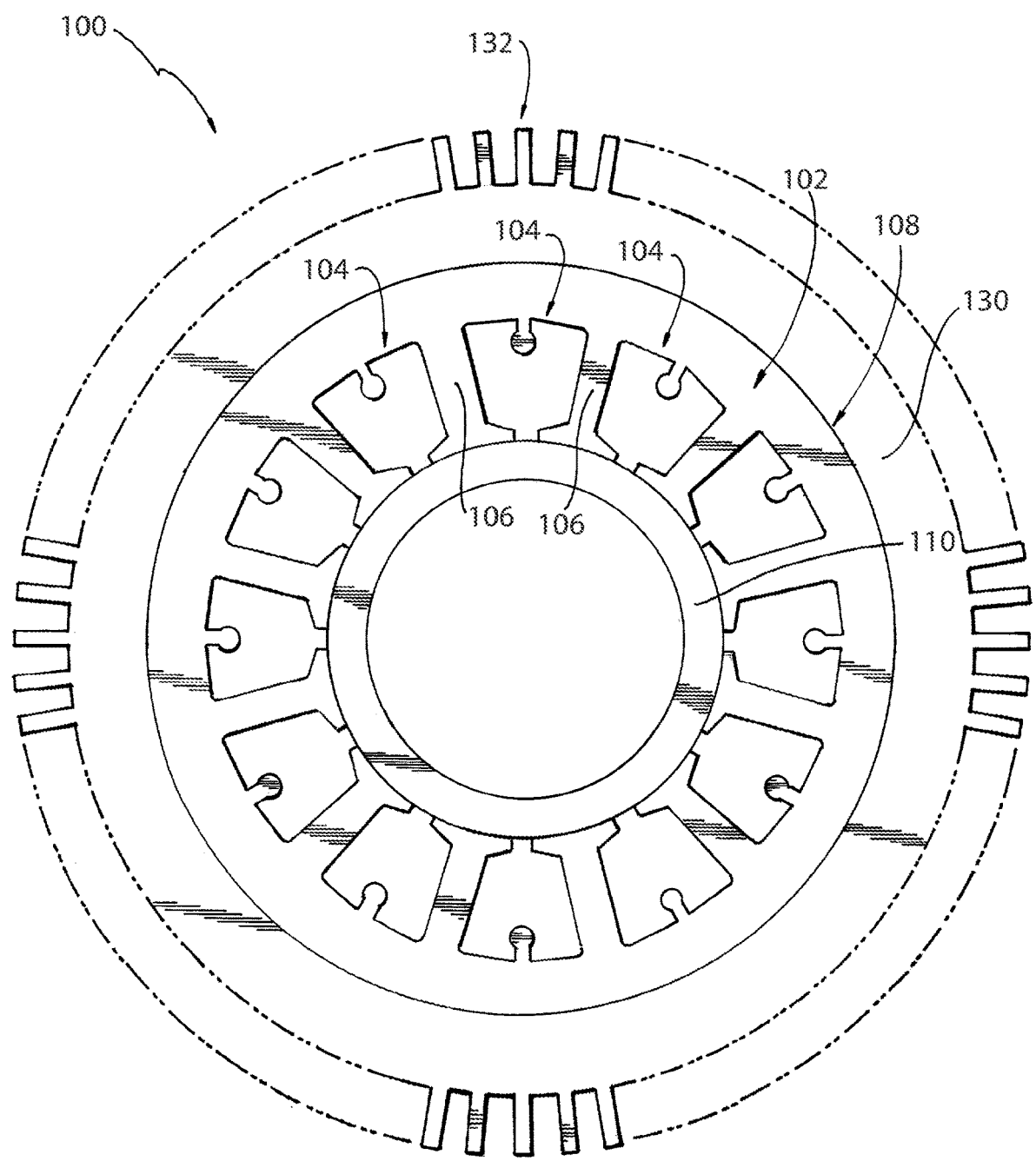
FIG. 1 is a schematic axial end view of an exemplary embodiment of an electric machine constructed in accordance with the present disclosure, showing the rotor and stator.

Reference will now be made to the drawings wherein like reference numerals identify similar structural features or aspects of the subject disclosure. For purposes of explanation and illustration, and not limitation, a partial view of an exemplary embodiment of an electric machine in accordance with the disclosure is shown in FIG. 1 and is designated generally by reference character 100. Other embodiments of electric machines in accordance with the disclosure, or aspects thereof, are provided in FIGS. 2-4, as will be described. The systems and methods described herein can be used for heat rejection in electric machines.

The electric machine 100 includes a stator that includes a winding yoke 102 defining a plurality of winding slots 104 between circumferentially spaced apart teeth 106. The winding yoke 102 is a part of a stator 108, and a rotor 110 is mounted within the stator 108 for rotary movement relative to the stator 108 about an axis A (shown in FIG. 3).

Figure 2:
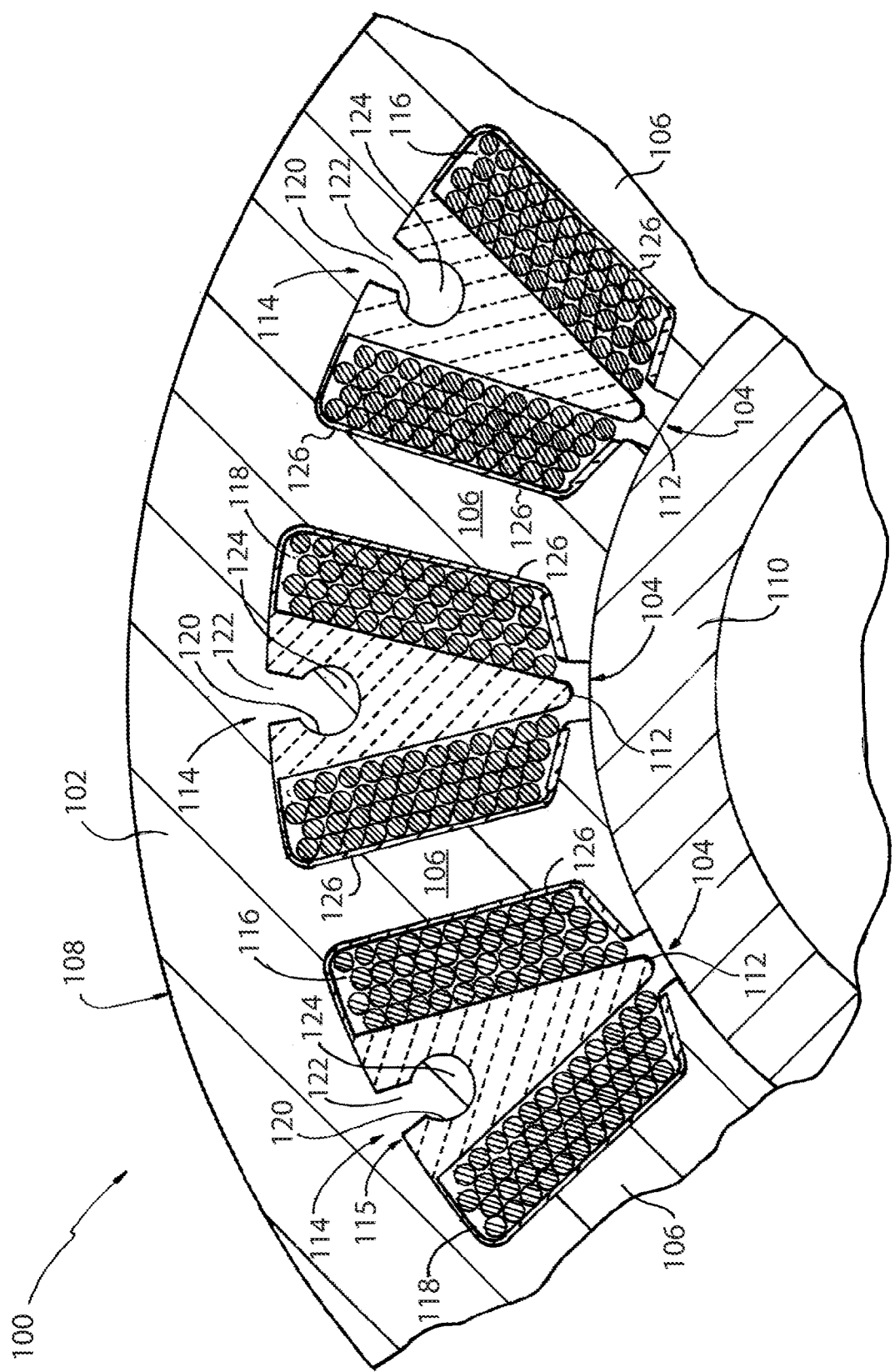
FIG. 2 is a schematic axial end view of a portion of the electric machine of FIG. 1, showing the keying feature.
Figure 3:
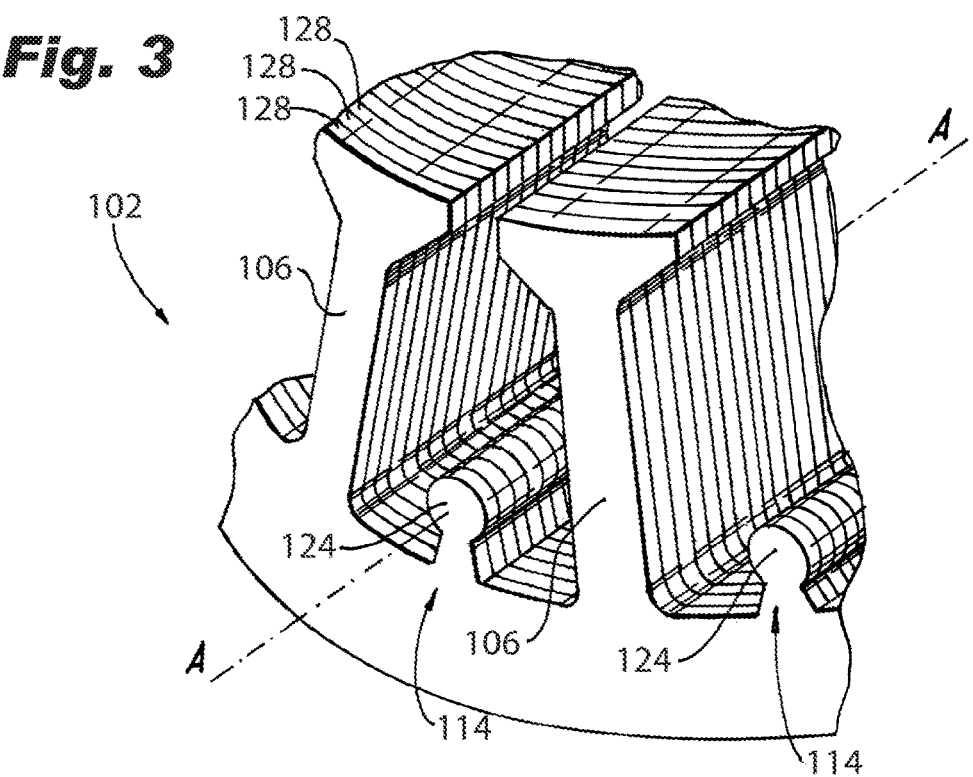
FIG. 3 is a schematic perspective view of a portion of the stator of FIG. 1, showing the keying feature extending in the axial direction.

With reference now to FIG. 2, a respective winding separator 112 is mounted within each of the winding slots 104. The winding separator 112 is mounted to a keying feature 114 that extends from the winding yoke 102 into the winding slot 104. The winding yoke 102 is a laminated structure as shown in FIG. 3, wherein the teeth 106 and keying features 114 are part of a common laminated structure with the winding yoke 102.

With continued reference to FIG. 2, a 116 first winding phase is seated in each winding slot 104 and a second winding phase 118 is seated in each winding slot 104 as well. The first and second winding phases 116, 118 are separated from one another by the respective winding separator 112.

The winding separator 112 includes at least one of thermally conductive ceramics and/or plastics. The keying feature 114 is in intimate thermal contact with a keying receptacle 120 of the winding separator 112. Thermal paste can be included between the keying feature 120 and the keying receptacle 114 (e.g. at the interface indicated by the reference character 115 in FIG. 2) to ensure a good heat conduction path is formed from the winding separator 112 to the winding yoke 102. The keying feature 114 includes a neck 122 that extends radially into the winding separator 112 and a head 124 extending radially from the neck 122 that is wider than the neck 122. This neck and head structure provides mechanical strength and support for mounting the winding separator 112 to the winding yoke 102 and also provides a large surface area for conducting heat from the winding separator 112 to the winding yoke 102. The keying feature 114 has a constant cross-sectional shape as a function of position in an axial direction, as shown in FIG. 3.

Figure 4:
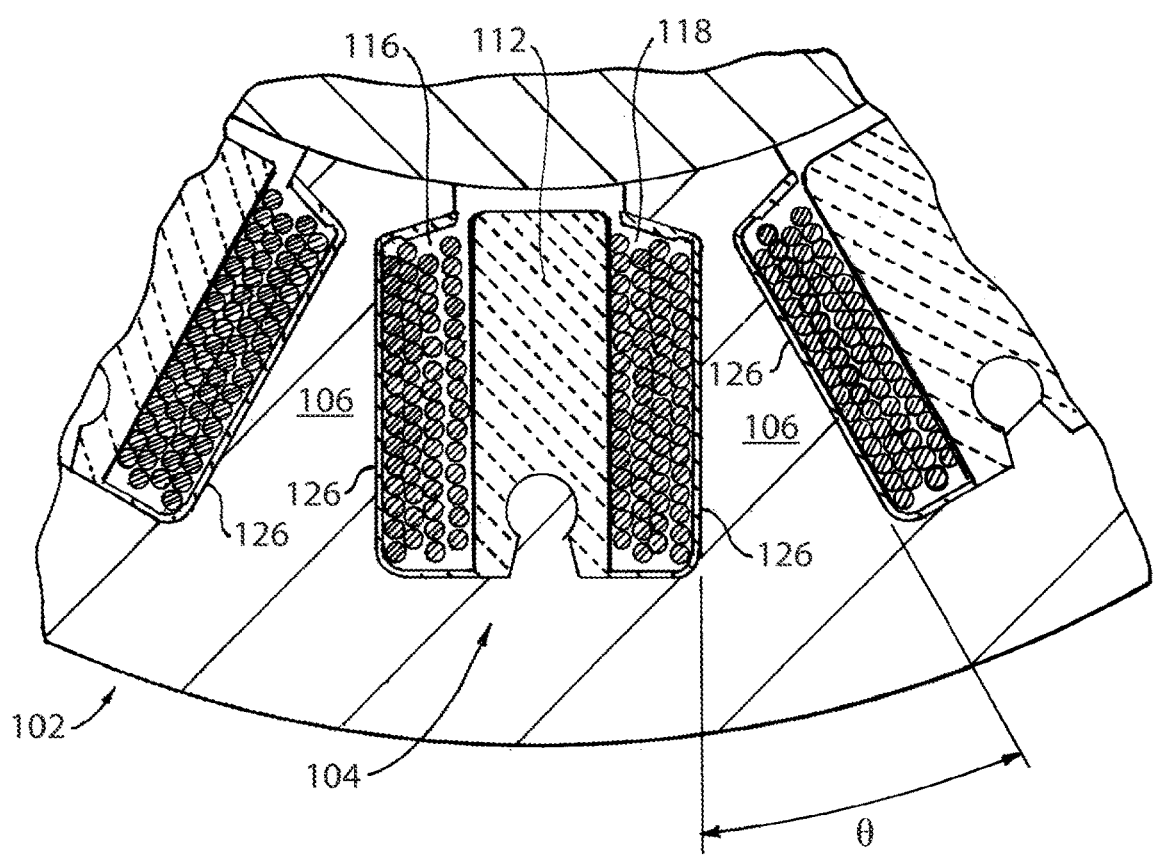
FIG. 4 is a schematic axial end view of another exemplary embodiment of a stator for an electric machine in accordance with the present invention, showing a stator with trapezoidal teeth and a winding separator with a rectangular cross-sectional shape.

Referring again to FIG. 2, each tooth 106 includes a pair of circumferentially spaced apart walls 126 that are parallel to one another. The winding separator 112 has a triangular axial cross-sectional shape separating the winding slot 104 into two sections (one for each winding phase 116, 118) with constant spacing between the winding separator 112 and circumferentially adjacent walls 126 of the teeth 106. As shown in FIG. 4, it is also contemplated that each tooth 106 can include a pair of circumferentially spaced apart walls 126 that are not parallel (as indicated by the oblique angle θ in FIG. 4), giving the tooth 106 a trapezoidal axial cross-sectional shape. In this case, the winding separator 112 can have a rectangular axial cross-sectional shape separating the winding slot 104 into two sections while still providing constant spacing between the winding separator 112 and circumferentially adjacent teeth 106.

A method includes punching a layer of material to form a layer, e.g., one of the layers 128 in FIG. 3, of an electric machine yoke, e.g. winding yoke 102. The layer of an electric machine yoke is punched to include a keying feature, e.g., keying feature 114, circumferentially between each pair of a plurality of circumferentially spaced apart teeth, e.g., teeth 106, of the layer of an electric machine yoke. The method can include individually punching at least one additional layer as that described above, wherein each layer of an electric machine yoke is punched to include a keying as described above. The method includes joining the layers of the plurality of layers of an electric machine yoke to form a yoke lamination for an electrical machine. Joining the layers includes joining the layers to form a stator yoke, e.g., to form the laminated winding yoke 102 as shown in FIG. 3, for an electric machine. A sleeve 130 including heat transfer fins 132 can be fitted to the winding yoke as shown in FIG. 1 to provide a heat path for rejecting heat from the winding phases 116, 118, through the winding separators 112, through the keying features 114 and the winding yoke 102 and out through the sleeve 130 and heat transfer fins 132.

Numerous potential benefits of systems and methods as disclosed herein include a direct thermally conductive heat rejection path is provided from the winding to the yoke, the winding separator is held in place by a keying feature, and the winding separator provides physical support to the magnet wire turns that worm the winding and holds the slot liner insulation in place. The methods and systems of the present disclosure, as described above and shown in the drawings, provide for electric machines with superior properties including improved heat rejection relative to traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine comprising:
   a winding yoke defining a plurality of winding slots between circumferentially spaced apart teeth; and
   a respective winding separator mounted within each of the winding slots, wherein the winding separator is mounted to a keying feature that extends from the winding yoke into the winding slot, wherein the keying feature includes a neck that extends radially into the winding separator and a head extending radially from the neck that is wider than the neck, wherein the winding yoke is a laminated structure, wherein the teeth and the neck and head of the keying features are laminated and are part of a common laminated structure with the winding yoke.

2. The electric machine as recited in claim 1, wherein the winding yoke is part of a stator, and further comprising a rotor mounted within the stator for rotary movement relative to the stator.

3. The electric machine as recited in claim 1, wherein each tooth includes a pair of circumferentially spaced apart walls that are parallel to one another, and wherein the winding separator has a triangular axial cross-sectional shape separating the winding slot into two sections with constant spacing between the winding separator and circumferentially adjacent teeth.

4. The electric machine as recited in claim 1, wherein each tooth includes a pair of circumferentially spaced apart walls that are not parallel, giving the tooth a trapezoidal axial cross-sectional shape, and wherein the winding separator has a rectangular axial cross-sectional shape separating the winding slot into two sections with constant spacing between the winding separator and circumferentially adjacent teeth.

5. The electric machine as recited in claim 1, wherein the keying feature is in intimate thermal contact with a keying receptacle of the winding separator.

6. The electric machine as recited in claim 5, further comprising thermal paste between the keying feature and the keying receptacle.

7. The electric machine as recited in claim 1, wherein the keying feature has a constant cross-sectional shape as a function of position in an axial direction.

8. The electric machine as recited in claim 1, further comprising a first winding phase seated in each winding slot and a second winding phase seated in each winding slot, wherein the first and second winding phases are separated from one another by the respective winding separator.

9. The electric machine as recited in claim 1, wherein the winding separator includes at least one of thermally conductive ceramics and/or plastics.

10. A method comprising:
punching a layer of material to form a layer of an electric machine yoke, wherein the layer of an electric machine yoke is punched to include a keying feature circumferentially between each pair of a plurality of circumferentially spaced apart teeth of the layer of an electric machine yoke; and individually punching at least one additional layer of material to form a plurality of layers of an electric machine yoke, wherein each layer of an electric machine yoke is punched to include a keying feature circumferentially between each pair of a plurality of circumferentially spaced apart teeth of the layer of an electric machine yoke, wherein the keying feature includes a neck that extends radially into the winding separator and a head extending radially from the neck that is wider than the neck, wherein the winding yoke is a laminated structure, wherein the teeth and the neck and head of the keying features are laminated and are part of a common laminated structure with the winding yoke.

11. The method as recited in claim 10, further comprising joining the layers of the plurality of layers of an electric machine yoke to form a yoke lamination for an electrical machine.

12. The method as recited in claim 11, wherein joining the layers includes joining the layers to form a stator yoke for an electric machine.

* * * * *